US006422378B1

(12) United States Patent
Allgaier

(10) Patent No.: US 6,422,378 B1
(45) Date of Patent: Jul. 23, 2002

(54) TRANSPORTER

(75) Inventor: Bernhard Allgaier, Niedereschach (DE)

(73) Assignee: Stein Automation GmbH (DE)

( * ) Notice: Subject to any disclaimer, the term of this patent is extended or adjusted under 35 U.S.C. 154(b) by 0 days.

(21) Appl. No.: 09/472,090

(22) Filed: Dec. 23, 1999

(51) Int. Cl.$^7$ .............................................. B65G 13/06
(52) U.S. Cl. ................................................ 198/781.03
(58) Field of Search ..................... 198/781.02, 781.03, 198/781.04

Primary Examiner—Christopher P. Ellis
Assistant Examiner—Kenneth W Bower
(74) Attorney, Agent, or Firm—Pendorf & Cutliff

(57) ABSTRACT

Transport device for work-pieces or the like, which are set upon plate or pallet-shaped work-piece carriers, with a support device, upon which the work-piece carrier is translationally displaceably seated, and a drive device, which is continuously driveable by a drive motor and in frictional contact with the work-piece carrier is brought, wherein the support device is comprised of plurality of sequentially arranged support rollers (26).

12 Claims, 3 Drawing Sheets

State of the Art

TRANSPORTER

BACKGROUND OF THE INVENTION

1. Field of the Invention

The invention concerns a transport device for work-pieces or the like.

2. Description of the Related Art

This type of device is generally well known and is employed in industries with substantially automated processes.

These known transport devices include plate or pallet-shaped work-piece carriers, upon which the material to be transported is deposited. The work-piece carriers are seated upon two drive belts running parallel to each other in the form of belt bands, which for their part are supported upon slide rails. The two belt bands are driven to rotate by a drive motor and thereby take along the work-piece carrier seated thereupon. It is thus necessary that the work-piece carrier frictionally engage the belt bands.

The problem in this regard is the contact occurring between the belt bands and the slide rails, since as a consequence of the high weight of the work-pieces inclusive of the work-pieces carried thereon, a high friction force occurs. This problem is enhanced in the case of a traffic jam of work-piece carriers, which occurs regularly, for example when work-pieces arrive at specific work stations for processing and thus the associated work-piece carriers are stopped. Thereby supplemental frictional forces occur between the belt and the stopped work-piece carrier.

As a consequence of this effect, high drive forces are required in order to ensure operation of the device. Nevertheless, there is a great danger, that in the case of an overload of the conveyor belts the drive motor becomes damaged. There is a further problem in that in the case of continued driving under a high loading a strong fouling occurs. Even if the glide rails are made of stainless steel with a stamped or indented upper surface, this cannot satisfactorily solve the above-mentioned problem. Finally, it can occur in the case of large volume work-pieces, that on the basis of the their larger area, the surface of the work-piece carrier does not have sufficient friction engaging contact and thus can slide on the conveyor belt.

The present invention is thus concerned with the task, of improving a transport device of the above-mentioned type in such a manner, that the above-mentioned disadvantages no longer occur. In particular, a reliable transport of work-piece carriers should be achieved under all operating conditions, without causing an overload of the drive motor.

SUMMARY OF THE INVENTION

The invention is based upon the idea, of providing the work-piece carrier upon support rollers, and in this manner to replace the conventional sliding friction, which occurs during transport of the work-piece carrier, with roller friction. Thereby the capacity of the drive means needed to operate the device is substantially reduced. In the case of a continuous operation, this results in a substantial savings and energy costs. Practical tests have found that a savings potential of up to 90% can be achieved.

Preferably two rows of support rollers are provided parallel to each other, wherein the spacing of the two rows is set to correspond to the (standardized) breadth of the workpiece carrier.

Preferably side guides are provided, between which the work-piece carrier is guided with close sideways tolerance. The close tolerance prevents a tipping of the work-piece carrier during the transport movement.

Further variants are concerned with optimizing the design of the drive device.

A first variant envisions the use of a conventional drive belt. As a result of the substantially reduced drive requirement, it is in most cases sufficient to employ a single drive belt, which frictionally engages with the work-piece carriers in the translation direction in a conventional manner.

It has been found to be particularly advantageous when, for the production of the press force necessary for frictional engagement, a multiplicity of sequential, individual slide bars are provided which act upon the drive belt via a spring or biasing device. As a consequence of the spring device, the drive belt is raised slightly, for example 1 to 5 mm. When a work-piece carrier passes over, the respective glide bar is pressed downwards by the weight of the work-piece carrier inclusive of the thereupon situated work-piece, producing a press force which ensures the frictional engagement between the drive belt and the work-piece carrier necessary for the transport. In this manner, the glide bar bars are loaded sequentially one after the other or, as the case may be, in groups, by the work-piece carrier being guided over them. In the case of a traffic jam, the drive belt continues to move below the stopped work-piece carriers. On the basis of the substantially reduced press force, there is, however, no danger of overheating of the drive motor. Also, overall the wear due to friction of the drive is substantially reduced. As a supplemental side effect, it has been determined that the noise level of the overall installation is very much reduced in comparison to the state of the art transport devices.

Preferably, each glide bar is individually spring biased. This makes possible an optimal loading of the drive belt, since the glide pieces are deflected by the work-piece carrier passing over without any reciprocal change-out action.

In a sense of a kinematic reverse, it is likewise possible to run the drive belt over a fixed—that is—not spring biased glide rail and in its place to provide on the work-piece carrier a spring-biased take-along rail, which ensures a defined pressure force for production of the frictional engagement with the drive belt. In this variant also, each work-piece carrier is supported via support rolls.

In a further variant the support rollers are spring-biased. Herein the spring characteristics are so determined, that the main load of the respective impacted support rollers is taken over and a pre-determined residual loading remains for production of the friction-locking contact to the non-yielding or unbiased drive belt.

It is understood that, on the basis of the above-described concept, transport devices can be run in any of various lengths. It can, however, be of advantage, to divide the drive unit into multiple, sequentially arranged, sectional drives, since if the drive belt is too long it must be tensioned too tightly.

A last variant is concerned therewith, to completely dispense with a drive belt in the design of the drive device and instead of this to employ a friction roller drive. Herein at certain separations or distances friction rollers are provided, this being between the support rollers. In this case it must also be ensured, using a spring device, that the friction rollers are pressed against the respective work-piece carriers, in order to produce a friction-locking contact.

According to an inventive concept, so-called "translators" can be constructed, with the help of which, using conventional means and manner, work-piece carriers can be removed perpendicularly to the transport direction.

BRIEF DESCRIPTION OF THE DRAWINGS

On the basis of the illustrative embodiment shown schematically in the drawing, the invention, advantageous embodiments, and improvements of the invention as well as particular advantages of the invention shall be discussed and described.

There is shown in.

DETAILED DESCRIPTION OF THE INVENTION

Figure 1:
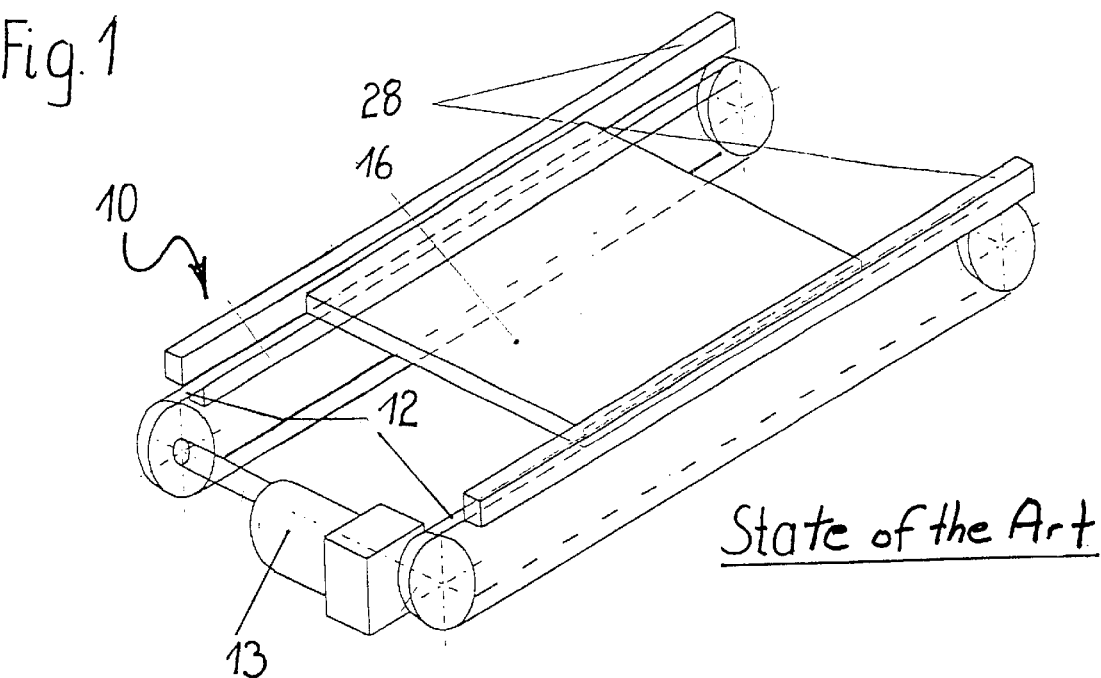
FIG. 1 a diagonal view of a known transport device.

In FIG. 1 a conventional transport device 10 corresponding to the state of the art is shown in diagonal view. It includes two drive belts 12 arranged parallel to each other, which are acted upon by a motor 13 and of which the upper running segment is respectively supported by a support rail. A work-piece carrier 16 resting upon the drive belt 12 presses the drive belt against the support rails 41 and produces thereby the friction locking contact necessary for the translational displacement with the drive belt 12. Side guides 18 arranged longitudinal along the sides direct the work-piece carrier 16 and ensure, that it is continuously centered on the transport device 10.

The support rails, here not shown in detail, a stamped or indented upper surface, over which the drive belt 12 slides or guides. The stampings or indentations ensure for a reduced frictional rubbing of the drive belt 12 against the support rails.

Figure 2:
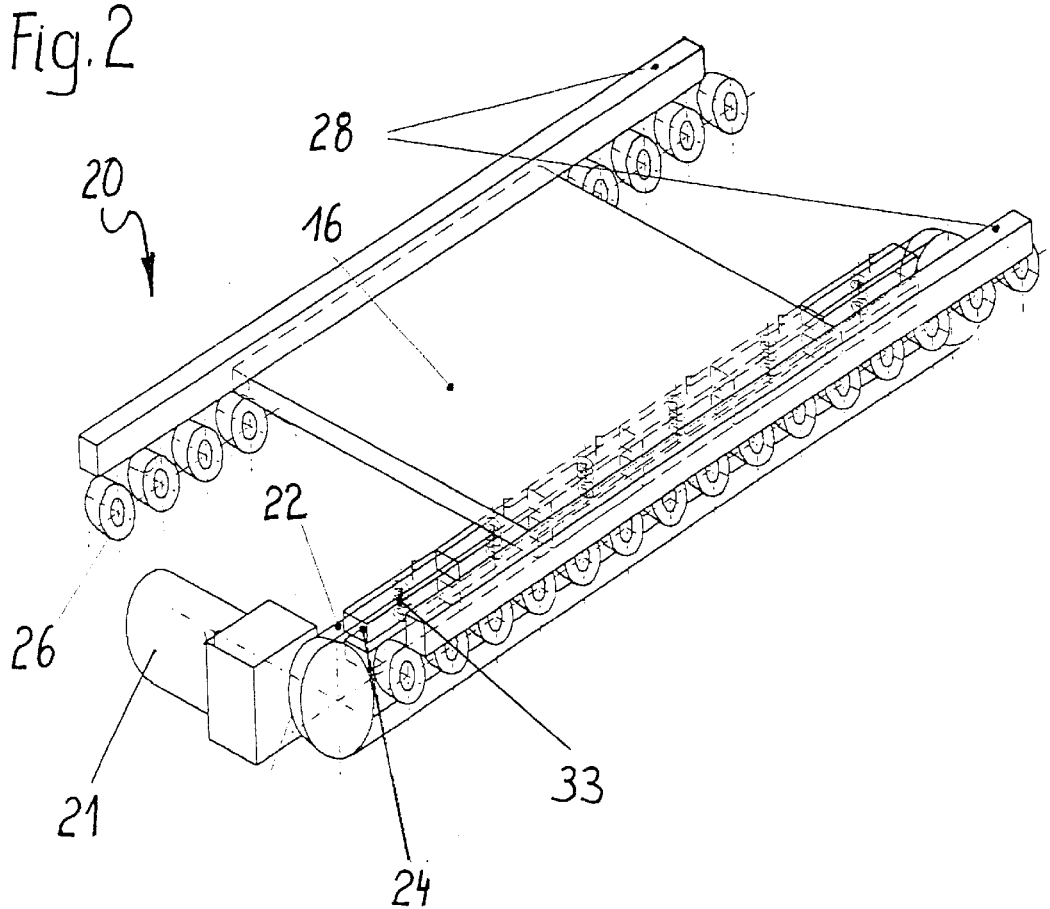
FIG. 2 a diagonal view of a transport device according to the invention.

In FIG. 2 an inventive transport device 20 is shown likewise in diagonal representation. Here also the transport movement occurs via a drive motor 21 acting on—in this case, one—drive belt 22, of which the upper segment likewise is supported.

A substantial departure from the state of the art is comprised therein that, while the work-piece carrier 16 to be transported may work in cooperation with a drive belt 22, its mass however is respectively taken up by support rollers 26 provided along both longitudinal sides, which take up the weight resting thereon.

The support rollers 26 are provided or arranged in a very close proximity a to each other, for example a $\leq 3/2$ R with R=Radius$_{support\ roll}$, so that surface pressing is minimized. The support rollers 26 are preferably provided with a (here not shown in greater detail) roller bearing, for example, pin bearings, ball bearings, or needle bearings, whereby a very low rolling resistance is achieved and therewith a comparatively small drive force is required for transport of the work-piece 16. As a result, the capacity of the drive motor 21 can be reduced by at least one-half in comparison to those used in the state of the art.

A further departure from the state of the art is that in the inventive transport device 20, in the place of two continuous one-piece support tracks, a multitude of individual, longitudinally aligned, sequentially arranged glide bars 24 are provided.

Figure 3:
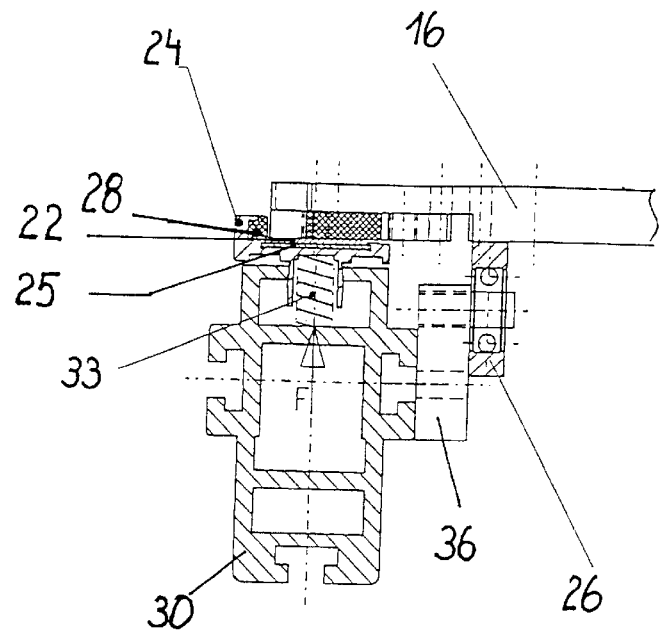
FIG. 3 a cross-section through the transport device according to FIG. 2.

The glide bars 24 are respectively provided with a spring means 23, which is here indicated only symbolically and in FIG. 3 is shown in greater detail.

In FIG. 3 a cross-section through the drive side of the 10 transport device is shown. A glide bar 24 with L-shaped cross section is guided into a box profile 30 and urged upwardly against the drive belt 22 via a helical pressure spring 33 in the direction of arrow F.

The glide bar 24 has, on its surface contacting the drive belt 22, a glide strip 25 of finely imprinted or indented stainless steel, which has particularly suitable gliding characteristics, that is, as a consequence of its low frictional value has a low gliding or sliding resistance.

The glide bar 24 has on its sides a side guide 28 directed 20 against the work-piece carrier 16 in the manner of an abutment glide bar.

In the inner side of the box profile 30, supports 36 for respectively one support roller 26 are secured. The supports 36 are height-adjustable, so that an optimal support height for the work-piece carrier 16 can be set for achievement of the pressure force exercised by the glide bars 24 on the drive belt 12.

Figure 4:
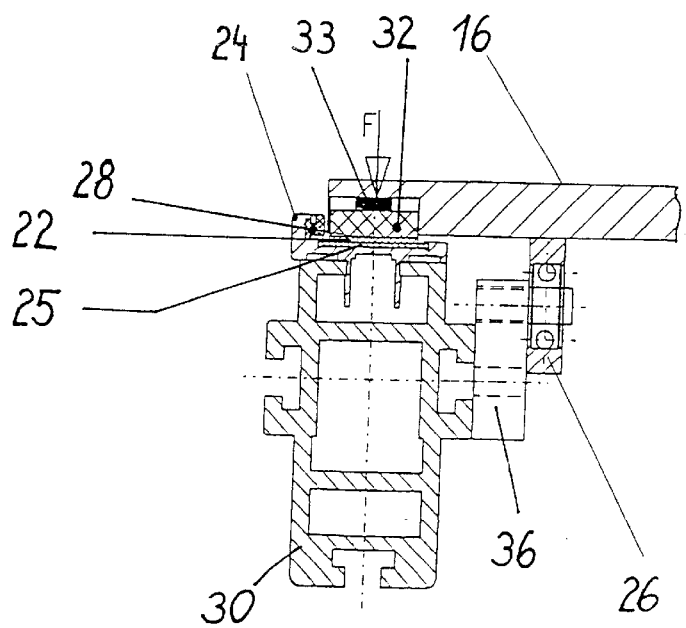
FIG. 4 a cross-section through a first variant of the transport device.

In FIG. 4 a variant of the inventive transport device 20 is shown.

Departing from the variant shown in FIG. 3, here the glide 30 bar 24 is provided stationary on the box profile 30, wherein the pressure force is produced by a spring device 33 integrated in the work-piece carrier 16 and transmitted to the drive belt 22 via a take-along bar 32. The further characteristics correspond to the design shown in FIG. 3.

Figure 5:
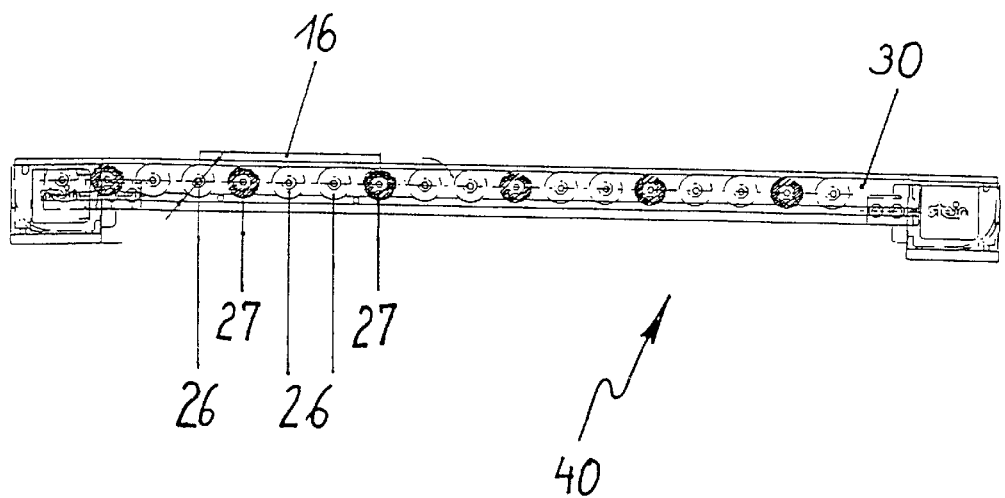
FIG. 5 a side view of a second variant of the transport device.

In FIG. 5 a side view of an alternative drive concept for the transport device 40 according to the invention is shown with friction rollers 27 acting upon the work-piece carrier 16.

In the place of a drive belt, friction rollers 27 are provided spaced apart from each other, which are provided between the support rollers 26, wherein in the shown example respectively two support rollers are situated between two drive rollers. The friction rollers 27 are spring mounted as discussed above, so that also here an optimal press-force for achievement of a friction locking is produced, in order to transport the work-piece carrier.

From the preceding description there can be seen as a common fundamental concept that the work-piece carriers 16 are supported so as to be easily transportable as a consequence of the support provided by the support-rollers 16, as a result of which, for a transport movement from stationary, essentially only the roller friction must be overcome. For the drive means a comparatively small capacity drive unit will suffice, in order to overcome the mass moment of inertia of the work-piece carrier inclusive of the thereupon placed work-pieces. Insofar as belts continue to be used for the drive, the friction rubbing is limited to a comparatively small amount.

In accordance with the inventive concept, it is possible not only to design conveyors for conventional transport devices. It is possible, beyond this, to also design translators.

REFERENCE NUMBERS LIST

10 Transport device (state of the art)
12 Drive belt
13 Drive motor
14 Carrier glide track (glide bar)
16 Work-piece carrier
18 Side guide
20 Transport device (inventive)
21 Drive motor
22 Drive belt 23 Spring device
24 Glide bar
25 Glide track
26 Support roller
27 Friction roller
28 Longitudinal guide
30 Box profile
32 Take-along bar
33 Spring device
36 Support
40 Alternative transport device (inventive)
44 Transport device

What is claimed is:

1. A transport device for transporting parts comprising:
    a drive belt;
    a part carrier in constant contact with the drive belt by frictional forces, the carrier adapted to transport parts and to work in cooperation with the drive belt;
    two spaced-apart rows of sequential support rollers, wherein the two spaced-apart rows are arranged parallel to each other; and
    a drive motor adapted to drive the drive belt.

2. A transport device according to claim 1, further including a number of sequentially arranged glide bars, the glide bars act individually via a spring means.

3. A transport device according to claim 2, wherein each glide bar is individually spring-mounted.

4. A transport device according to claim 1, wherein said transport device is a translator acting perpendicular to a conveyor system.

5. A transport device according to claim 1, wherein said carrier is pallet-shaped.

6. A transport device according to claim 1, wherein said parts are work-pieces provided upon carrier plates.

7. A transport device according to claim 1, wherein the support rollers are spaced at a distance equal to a;
    wherein a $\leq 3/2$ R, and wherein R is equal to the radius of the support rollers.

8. A transport device for transporting parts comprising:
    a drive belt;
    a part carrier in constant contact with the drive belt by resilient means contact, the carrier adapted to transport parts by frictional forces with the drive belt;
    two spaced-apart rows of sequential support rollers, wherein the two spaced-apart rows are arranged parallel to each other;
    a drive motor adapted to drive the drive belt; and
    a number of sequentially arranged glide bars in friction contact with the drive belt, each glide bar having a top, a bottom, left side and a right side;
    wherein the weight of the carrier is taken by the support rollers.

9. A transport device according to claim 8, wherein each glide bar acts individually upon the drive belt via a biasing device.

10. A transport device according to claim 8, wherein the bottom of each glide bar is connected to the drive belt by a glide strip.

11. A transport device according to claim 8, further including a side guide arranged longitudinal along one of the sides of the glide bar, the side guide adapted to guide the carrier.

12. A transport device according to claim 8, wherein the support rollers are spaced at a distance equal to a;
    wherein a $\leq 3/2$ R, and wherein R is equal to the radius of the support rollers.

* * * * *